United States Patent
Williams

(10) Patent No.: US 11,341,657 B2
(45) Date of Patent: May 24, 2022

(54) SYSTEMS AND METHODS FOR MONITORING AND CONTROLLING A MULTI-PHASE FLUID FLOW

(71) Applicant: Stratos Perception LLC, Houston, TX (US)

(72) Inventor: Rube Ben Williams, Houston, TX (US)

(73) Assignee: STRATOS PERCEPTION LLC, Houston, TX (US)

(*) Notice: Subject to any disclaimer, the term of this patent is extended or adjusted under 35 U.S.C. 154(b) by 0 days.

(21) Appl. No.: 17/424,130

(22) PCT Filed: Mar. 31, 2020

(86) PCT No.: PCT/US2020/026001
§ 371 (c)(1),
(2) Date: Jul. 19, 2021

(87) PCT Pub. No.: WO2020/205886
PCT Pub. Date: Oct. 8, 2020

(65) Prior Publication Data
US 2022/0044421 A1 Feb. 10, 2022

Related U.S. Application Data

(60) Provisional application No. 62/936,948, filed on Nov. 18, 2019, provisional application No. 62/900,469, (Continued)

(51) Int. Cl.
*G06T 7/246* (2017.01)
*G06T 7/10* (2017.01)
(Continued)

(52) U.S. Cl.
CPC .............. *G06T 7/246* (2017.01); *G01N 11/02* (2013.01); *G01S 15/89* (2013.01); *G06T 7/10* (2017.01);
(Continued)

(58) Field of Classification Search
None
See application file for complete search history.

(56) References Cited

U.S. PATENT DOCUMENTS

| 8,892,371 B2 * | 11/2014 | Henry | G01F 1/8436 |
| | | | 702/50 |
| 9,605,529 B1 * | 3/2017 | Venter | G01V 8/00 |

(Continued)

FOREIGN PATENT DOCUMENTS

| CN | 102706534 A | * | 10/2012 | |
| CN | 104089985 A | * | 10/2014 | .............. G01F 1/667 |

(Continued)

OTHER PUBLICATIONS

Young, Lee, International Search Report and Written Opinion for PCT App. No. PCT/US20/26001, dated Sep. 9, 2020, 8 pages, United States Patent and Trademark Office as the International Searching Authority, Alexandria, VA.

(Continued)

*Primary Examiner* — Jiangeng Sun
(74) *Attorney, Agent, or Firm* — Crain Caton and James

(57) ABSTRACT

Systems and methods for monitoring and controlling dynamic multi-phase flow phenomena, capable of sensing, detecting, quantifying, and inferring characteristics, properties, and compositions (including static and dynamic characteristics, properties and compositions). The systems combine machine vision and mathematical models, which enables direct observation and detection of static and dynamic multi-phase fluid flow properties and phenomena (e.g. voids, waves, shadows, dimples, wrinkles, foam, bubbles, particulates, discrete materials, collections of materials, and position) and inferring other properties and phenomena (e.g. flow regimes, bubble velocities and accelerations, material deposition rates, erosion rates, phasic critical behavioral points as related to heat transfer, and the volu- (Continued)

metric and mass flow rates of the phases) that are used to monitor and control systems applied to a multi-phase fluid flow system.

21 Claims, 6 Drawing Sheets

Related U.S. Application Data filed on Sep. 14, 2019, provisional application No. 62/863,649, filed on Jun. 19, 2019, provisional application No. 62/827,187, filed on Apr. 1, 2019.

(51) Int. Cl.
| | | |
|---|---|---|
| *G06T 7/73* | (2017.01) | |
| *G01N 11/02* | (2006.01) | |
| *G01S 15/89* | (2006.01) | |
| *G06T 7/60* | (2017.01) | |
| *G06V 10/26* | (2022.01) | |
| *G06K 9/62* | (2022.01) | |

(52) U.S. Cl.
CPC .................. *G06T 7/60* (2013.01); *G06T 7/73* (2017.01); *G06K 9/62* (2013.01); *G06T 2207/10016* (2013.01); *G06T 2207/10048* (2013.01); *G06T 2207/10132* (2013.01); *G06T 2207/20084* (2013.01); *G06V 10/26* (2022.01)

(56) References Cited

U.S. PATENT DOCUMENTS

| | | |
|---|---|---|
| 2015/0075273 A1 | 3/2015 | Sondhi |
| 2016/0076926 A1 | 3/2016 | McCann et al. |
| 2017/0169313 A1 | 6/2017 | Choi et al. |
| 2017/0212024 A1 | 7/2017 | Hunt et al. |
| 2018/0321068 A1 | 11/2018 | Meribout et al. |

FOREIGN PATENT DOCUMENTS

| | | | | |
|---|---|---|---|---|
| CN | 104101687 A | * | 10/2014 | |
| CN | 105426889 A | | 3/2016 | |
| CN | 107392250 A | * | 11/2017 | ......... G01N 29/4418 |
| CN | 109685117 A | * | 4/2019 | ........... G06K 9/6217 |

OTHER PUBLICATIONS

Jensen, William P., Chapter II Demand and Article 34 Response for PCT App. No. PCT/US20/26001, Jan. 22, 2021, 13 pages, Houston, TX.

Graysay, Tamara, Corrected International Preliminary Report on Patentability for PCT App. No. PCT/US20/26001, dated Jul. 8, 2021, 4 pages, United States Patent and Trademark Office as the International Preliminary Examination Authority, Alexandria, VA.

* cited by examiner

SYSTEMS AND METHODS FOR MONITORING AND CONTROLLING A MULTI-PHASE FLUID FLOW

CROSS-REFERENCE TO RELATED APPLICATIONS

This application is a U.S. National Stage Application of PCT Patent Application Serial No. PCT/US20/26001, filed Mar. 31, 2020, which claims priority to U.S. Provisional Application No. 62/827,187, filed Apr. 1, 2019, U.S. Provisional Application No. 62/863,649, filed Jun. 19, 2019, U.S. Provisional Application No. 62/900,469, filed Sep. 14, 2019, and U.S. Provisional Application No. 62/936,948, filed Nov. 18, 2019, each of which are incorporated herein by reference.

FIELD OF THE DISCLOSURE

The present disclosure pertains to systems and methods for monitoring and controlling a multi-phase fluid flow that is capable of sensing, detecting, quantifying, and inferring characteristics, properties, and compositions, including static and dynamic characteristics, properties and compositions of the multi-phase fluid flow. More particularly, the systems combine machine vision and mathematical models, which enable direct observation and detection of static and dynamic multi-phase fluid flow properties and phenomena (e.g. voids, waves, shadows, dimples, wrinkles, foam, bubbles, particulates, discrete materials, collections of materials, and position) and inferring other properties and phenomena (e.g. flow regimes, bubble velocities and accelerations, material deposition rates, erosion rates, phasic critical behavioral points as related to heat transfer, and the volumetric and mass flow rates of the phases) that may be used to monitor and control systems requiring a multi-phase fluid flow.

BACKGROUND

Virtually all processing technologies involve some form of multiphase fluid flow. In fluid mechanics, a multi-phase flow is the simultaneous flow of materials with two or more thermodynamic phases. Multi-phase fluids therefore, include any combination of liquids and/or gases, which may be transmitted with compositions of particulates, muds, rocks, debris, organic materials, inorganic materials, crystals, molecules, atoms, ions, electrons, and any material that can flow in a path or channel, or flow over a plate or object, or flow through space. As described herein, flow generally refers to any transport of materials collectively or fluidly, from one point to another.

Multi-phase fluid flow is inherently unstable. In a two-phase flow, for example, several flow regimes can exist (e.g. bubbly flow, slug flow, annular flow) and are highly sensitive to the external acceleration field. In thermal management applications for space, where weak gravitational forces are unable to effectively drive phase separation, the inherent instabilities are exacerbated causing serious design problems and presenting high operational risks due to the potentially sizeable thermal transients that can occur as a function of flow regime and the acceleration field. Further, flow regime, flow rate, heat-flux, flow quality, void fraction, phase velocities, pressure drop, pressure, and temperature are all interdependent in a two-phase flow where a change in the flow regime can cause step changes in the other fluid dynamic and thermodynamic properties of the flow. However, attributes such as void fraction and phasic fluid flow rates and velocities have been traditionally unaccommodating to real-time measurement. Due to the instability inherent in a multi-phase fluid flow, a need exists to accurately discern the thermal and fluid characteristics in a multi-phase fluid flow channel and provide such information in real-time to a control system.

Techniques have been developed to mitigate the problem of observing intrinsic properties of a multi-phase fluid flow in real-time by inferring, for example, the void fraction in a two-phase flow as a function of the capacitance across a flow channel, and the flow regime. Such techniques can be useful for special cases of a two-phase flow but have severe inherent scope limitations since their calibrations tend to drift, and they primarily apply to small channel flows and fluids with a constant and high dielectric behavior. These techniques thus, can exclude large classes of two-phase fluid flow applications (e.g. large channels, low and varying dielectrics, electrical interference), as well as most multi-phase fluid flow applications.

BRIEF DESCRIPTION OF THE DRAWINGS

The present disclosure is described below with references to the accompanying drawings in which like elements are referenced with like reference numerals, and in which.

DETAILED DESCRIPTION OF THE ILLUSTRATIVE EMBODIMENTS

Figure 1:
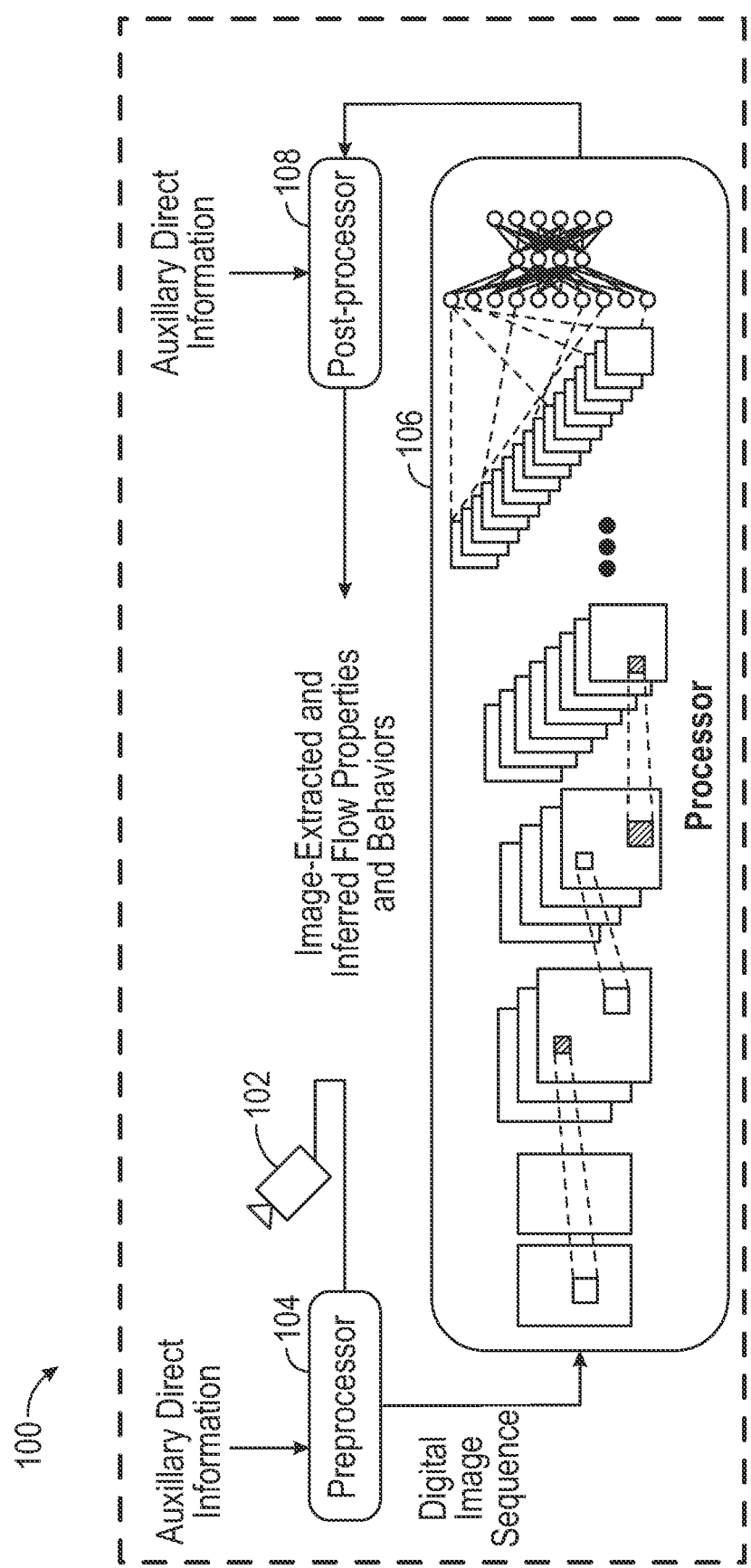
FIG. 1 is a schematic diagram illustrating an intelligent sensor system.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

In one embodiment, the present disclosure includes a system for monitoring a multi-phase fluid flow, comprising: i) a preprocessor for receiving, filtering, and formatting digital images of the multi-phase fluid flow; ii) a processor that includes a neural network learning algorithm linked to the preprocessor for receiving the preprocessed digital images, identifying phenomena related to the multi-phase fluid flow in the preprocessed digital images and quantifying the relative positions and geometries of the phenomena based on the digital images; and iii) a post processor linked to the processor for receiving the identified phenomena, receiving the quantified relative positions and geometries of the phenomena, deriving dynamic attributes of the identified phenomena and inferring other attributes related to the multi-phase fluid flow.

In another embodiment, the present disclosure includes a method for monitoring a multi-phase fluid flow, comprising: i) capturing at least one attribute of the multi-phase fluid flow; ii) identifying phenomena related to the multi-phase fluid flow based on the at least one attribute of the multi-phase fluid flow; iii) quantifying the relative positions and geometries of the phenomena; iv) deriving dynamic attributes related to the phenomena by correlating relative positions and geometries of the phenomena based on a sequence of the at least one attribute captured over a predetermined time-period; and v) inferring other attributes related to the multi-phase fluid flow based on the identified phenomena, the quantified relative positions and geometries of the phenomena and the derived dynamic attributes related to the phenomena.

The present disclosure overcomes one or more deficiencies in the prior art by providing systems and methods for monitoring and controlling dynamic multi-phase flow phenomena using machine vision and mathematical models, which enable direct observation and detection of static and dynamic multi-phase fluid flow properties and phenomena (e.g. voids, waves, shadows, dimples, wrinkles, foam, bubbles, particulates, discrete materials, collections of materials, and position) and inferring other properties and phenomena (e.g. bubble velocities and accelerations, material deposition rates, erosion rates, phasic critical behavior points as related to heat transfer, and the volumetric and mass flow rates of the phases). The ability to sense, detect, quantify, and infer characteristics, properties and compositions, including static and dynamic characteristics, properties and compositions, sets the system and methods herein apart from conventional processes.

Referring now to FIG. 1, a schematic diagram illustrates an intelligent sensor system 100, that directly identifies and quantifies flow regimes and other multi-phase fluid flow phenomena in multi-phase fluid flows, in real-time, or as needed. The sensor system 100 is composed of a camera 102, a preprocessor 104, a processor 106, and a post processor 108. Information in the form of digital images are created of the source (multi-phase fluid flow) by the camera 102 with a frame rate fast enough to discern the fluid flow phenomena. The camera 102 acquires a sequence of images (e.g. a video recording) and provides the images as ordered input to the pre-processor 104 that prepares the data, as required, as digital information input to the processor 106. The sensor system 100 can, in real-time or otherwise, simultaneously identify and localize the flow regimes and other multi-phase fluid flow phenomena and behaviors in the images from the camera 102. For a wide field of view, the sensor system 100 can simultaneously identify and localize the flow regimes and other multi-phase fluid flow phenomena in multiple flow and stagnant channels, and at several different locations along each channel within the field of view of the camera, utilizing one camera 102. Nevertheless, for large or complex regions of interest, a distributed imaging system (e.g. multiple cameras) could be utilized.

The sensor system 100 can be trained (e.g. via neural network learning algorithms, such as an appropriate convolutional neural network learning algorithm ("CNN"), recurrent neural network back-propagation algorithm, or genetic algorithm) to recognize and detect select multi-phase fluid flow phenomena prior to its implementation. Such training may include backpropagation and its variants, and genetic algorithms. The training of the processor 106 can be accomplished off-line, online, or a combination of both. Additionally, the sensor system 100 recognition components may include directly programmed components (e.g. non-learning or non-neural network-based learning) such as image segmentation processes.

The CNN identifies and detects, within each digital image, types of phenomena and behaviors, and the relative position (within the borders of the image) of such phenomena and behaviors. The purpose of the algorithms is to extract visually recognizable information from images, where such images may be a sequence of image frames comprising a stored (i.e. previously recorded) video, live camera video, live camera feed, or other composition of images. The outputs of the CNN are select qualitative and quantitative descriptions of the multi-phase fluid flow field and associated phenomena and behaviors, which can include the identification of flow regimes and artifacts (e.g. bubbles, shadows, voids, particulates, particulate dispersions and patterns, mud and film thicknesses, and waves), and the relative positions and geometries of such flow regimes, phenomena, and artifacts.

A key feature of the sensor system 100 is the use of a deep learning CNN, employing an object detection algorithm, as the processor 106 because of its ability to learn and to recognize an essentially unlimited variety of visual observable features and behaviors in images. The processor 106 can also be implemented by other object recognition algorithms and processes, including those that are incapable of online learning, such as image segmentation algorithms. The processor 106 can also be extended to recognize nonvisual features, e.g. sound, via other adaptive learning algorithms, such as deep learning recurrent neural networks, including Long-Short-Term-Memory implementations of such networks. Other types of neural networks can be utilized as the processor 106, including, but not limited to, multilayer perceptron networks. As part of its recognition capability, specific classes, types of phenomena, associated geometries and positioning can be inferred by the CNN and transferred to the post-processor 108 for computing and inferring other attributes, such as, for example, volume, drag coefficients, mass flow rates, phase velocities, and bubble growth rates.

Figure 6:
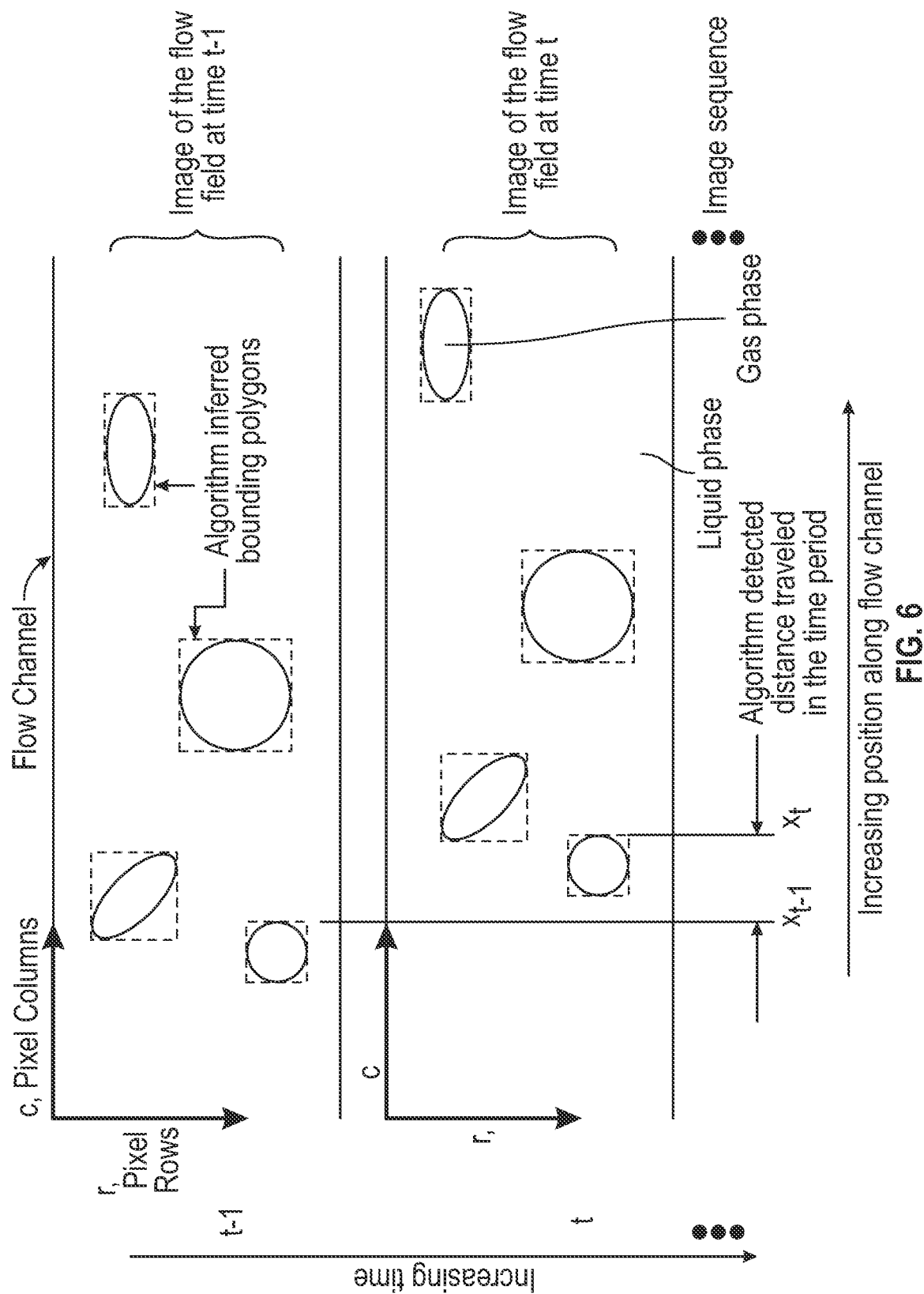
FIG. 6 is a schematic diagram illustrating various quantities detected for inferring geometry, position and dynamic attributes of a multi-phase fluid flow.

Another key feature of the sensor system 100 is its ability to couple the observations of visually inspectable phenomena, artifacts and positions in a sequence of images with dynamic behaviors inferred from an observed series of positions as extracted from such sequence of images. The CNN learning and recognition feature thus, can superimpose polygons around the detected phenomena and artifacts (with vertices assigned from a coordinate system super-imposed on the image pixel field) to aid the inference of geometry, position and dynamic behaviors in the flow field as illustrated in FIG. 6. Dynamic behaviors include, but are not limited to velocities, accelerations, vibration frequencies, and integrations (e.g. summations of areas or volumes), which allows mathematical derivatives and integrations of observed positions to be inferred by the sensor system 100 and enables it to further infer differential equations describing the dynamic behaviors of phenomena and artifacts observed in the flow field.

Figure 5:
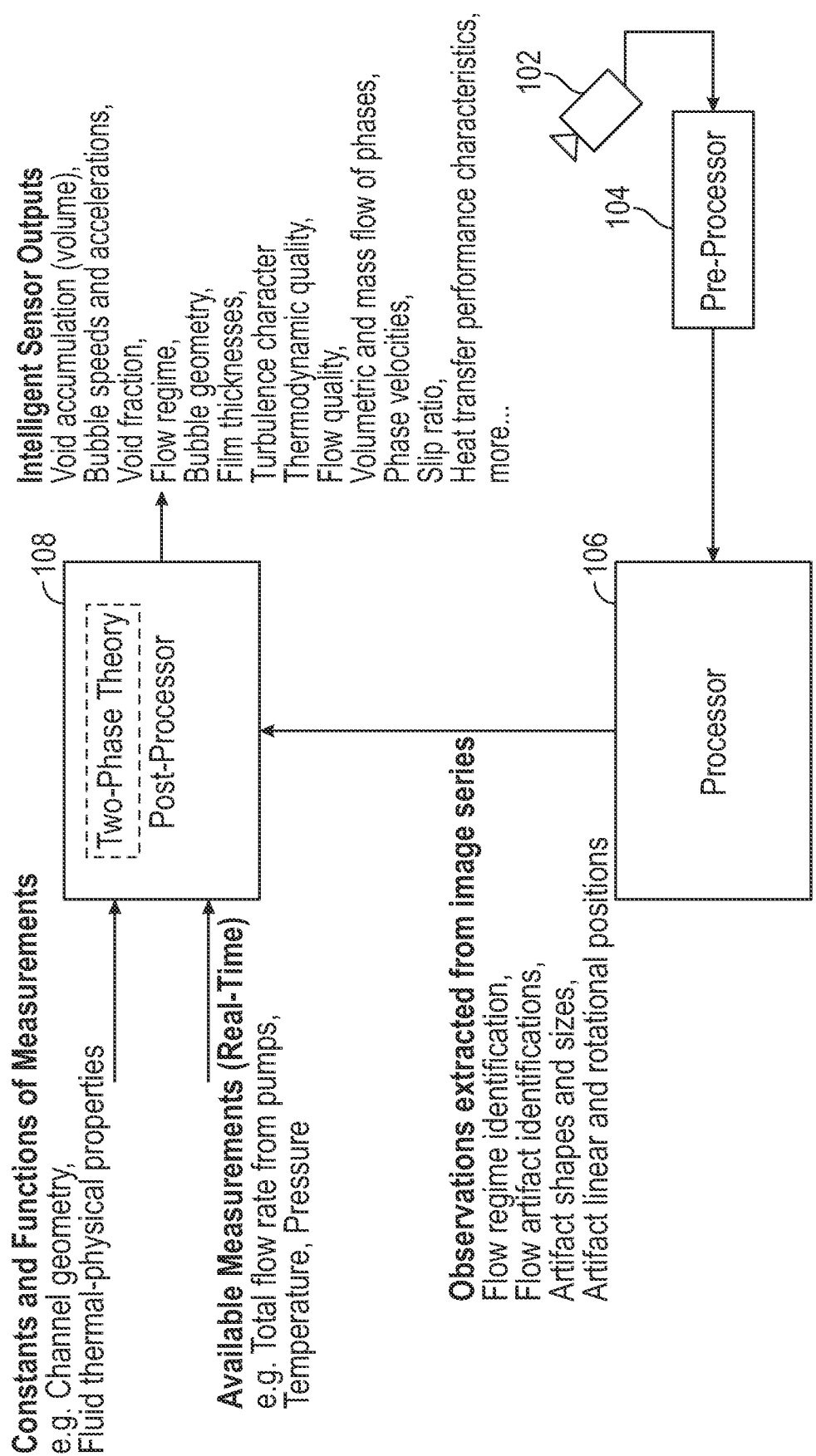
FIG. 5 is a schematic diagram illustrating exemplary post-processor inputs and outputs for the intelligent sensor system in FIG. 1.

The coupling of observations with derived dynamic behaviors primarily occurs in the post-processing of the observations as illustrated in FIG. 5. In this manner, the post-processor 108 can utilize physics-based theoretical and empirical models for the accurate estimation and filtering of behaviors and state variables that may be embedded, ephemeral, and otherwise difficult to observe and measure. The result is powerful, since access to differential equations determining multi-phase fluid flow behaviors can lead to the design of stable and sophisticated processes by engineers and encourage wide-spread adoption of multi-phase fluid flow processes in orbital systems.

Further, the sensor system 100 can be extended to learn and recognize nonvisual features and behaviors by including alternate learning methods into the processor 106, including, but not limited to, recurrent neural network formulations, as required. The purpose of such auxiliary neural networks is to enable the learning and recognition of information that is auxiliary to the images (e.g. sound) to enable greater informational context into the post-processor 108 for detecting and characterizing flow phenomena.

The outputs of the processor 106 are provided to a post-processor 108 that processes such outputs (now as inputs into such post-processor) as required to provide appropriately useful inputs to monitoring and control units. The outputs of the post-processor 108 include directly observed properties, and computed and inferred properties and dynamic behaviors, phenomena, and artifacts, (e.g. velocities, accelerations, and vibration frequencies, drag coefficients, refraction indexes, reflections, mixing, and stratifications, thermodynamic quality, phase velocities, and phase mass flow rates), and operational and theoretical conclusions. Control units utilize the outputs from the post-processor 108 as inputs to inform control algorithms and models concerning the correct actions required of active components to accomplish the goals of the multi-phase fluid flow system and dependent and governing systems. Such goals may include regulating the performance of heat exchangers, controlling flow rates, mitigating non-desirable states, managing material deposition, managing material composition, optimizing chemical reactions, or otherwise working with the flow to achieve a physical goal.

For dynamic data inference, the post-processor 108 will typically expect that the images are ordered sequentially in time with a known or derivable time differential between images (e.g. video image frames). However, such ordering and known time differential between images is not necessary for all applications where the post-processor 108 is programmed to interpret the image sequence stochastically or in some other nonlinear fashion that supports the monitoring and control objectives of the fluid processes.

Software (or hardware) comprising and supporting the pre-processor 104 and the post-processor 108 may also include adaptive learning components, such as neural networks, as well as non-adaptive, relatively fixed coded, theoretical and empirical models. All implementations of the logic associated with the sensor system 100 therefore, may be implemented partially or fully in software or hardware (e.g. electronics), as technology permits, and is advantageous for reasons including, but not limited to, cost, speed, and form factors.

Figure 2:
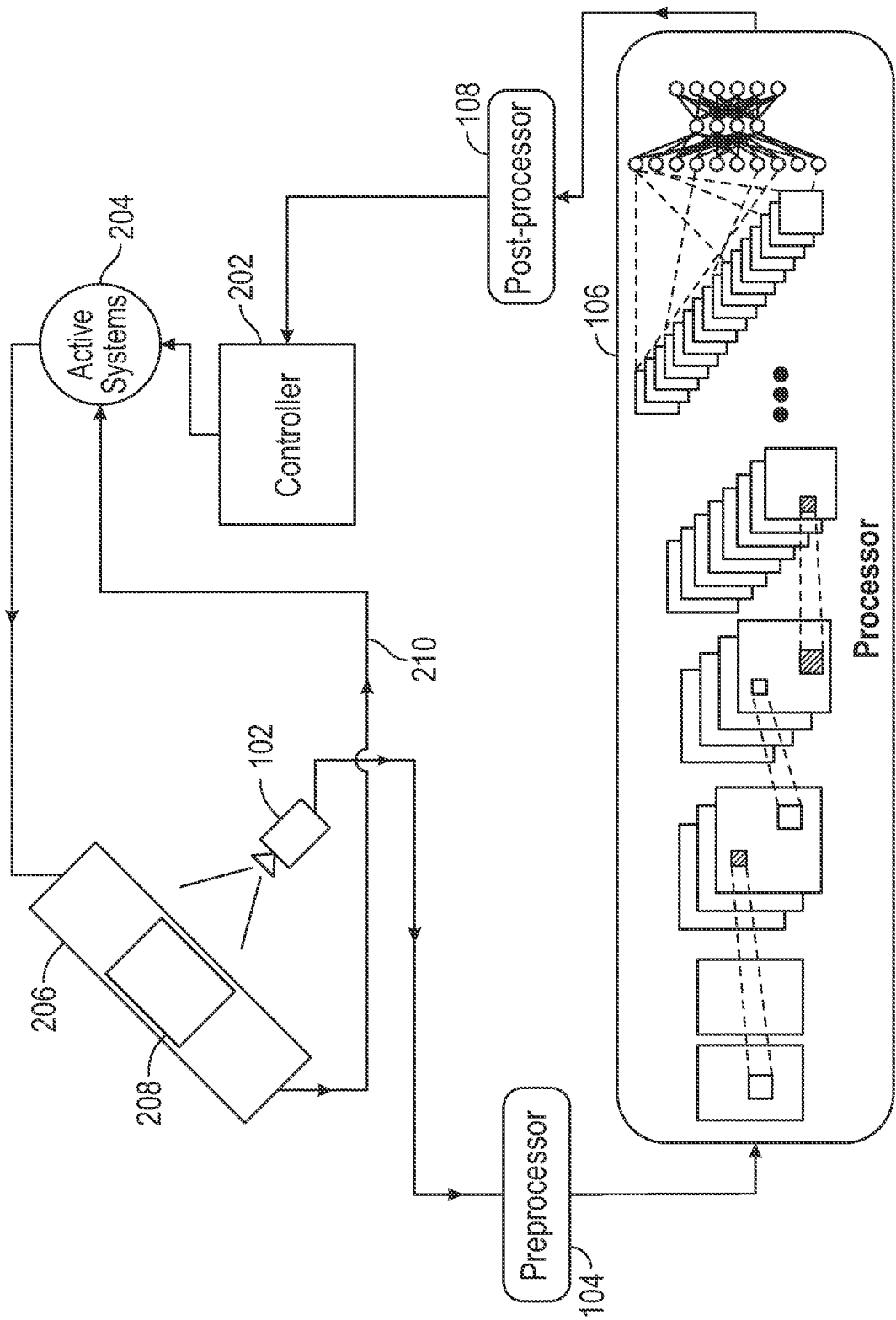
FIG. 2 is a schematic diagram illustrating an exemplary closed loop process for monitoring and controlling multi-phase fluid flow phenomena with the intelligent sensor system in FIG. 1.
Figure 3:
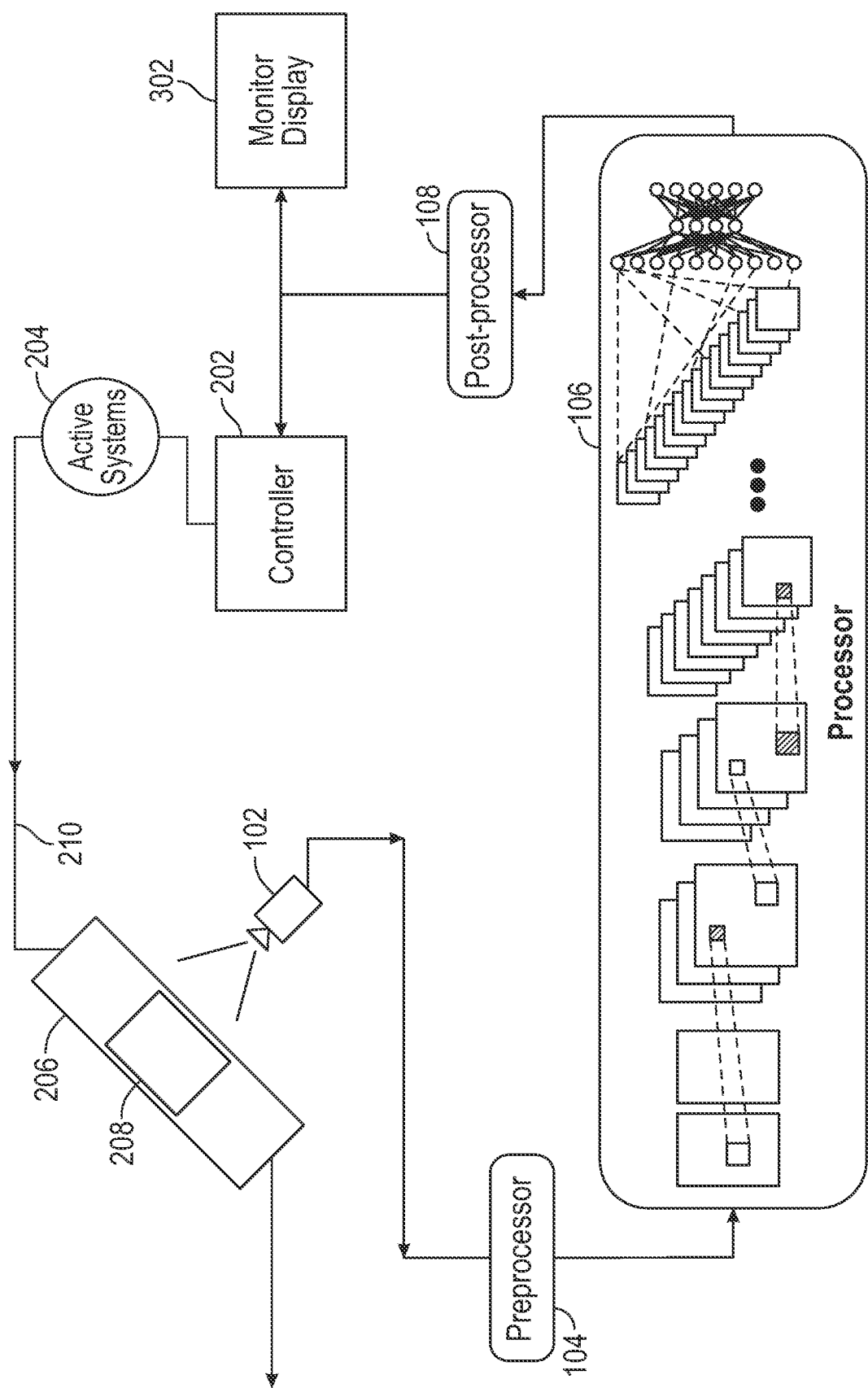
FIG. 3 is a schematic diagram illustrating an exemplary open loop process for monitoring and controlling multi-phase fluid flow phenomena with the intelligent sensor system in FIG. 1.
Figure 4:
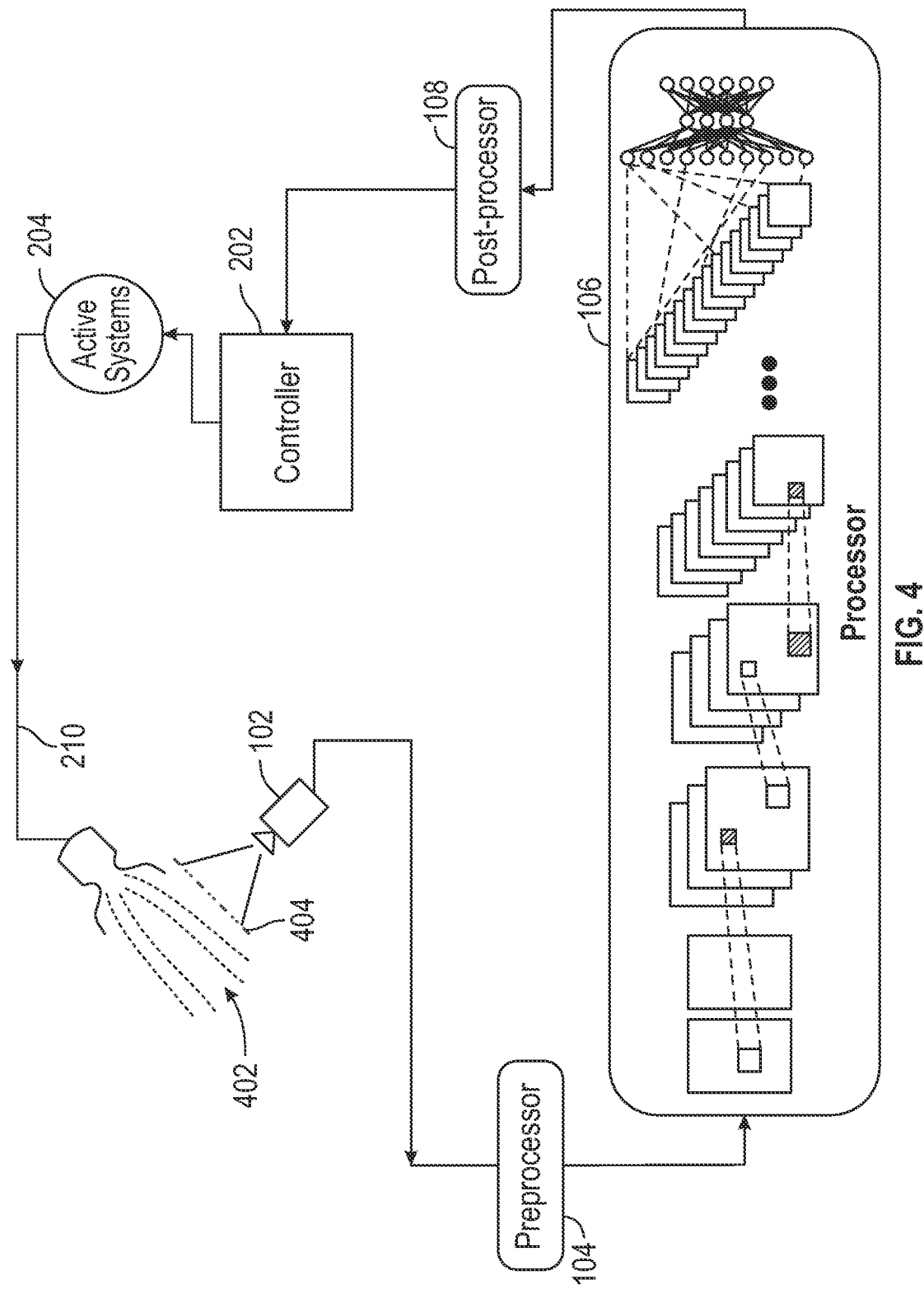
FIG. 4 is a schematic diagram illustrating an exemplary open loop process for monitoring and controlling multi-phase fluid flow in the form of exhaust from a rocket nozzle with the intelligent sensor system in FIG. 1.

Referring now to FIGS. 2-4, the schematic diagrams illustrate exemplary processes for monitoring and controlling multi-phase fluid flow phenomena with the sensor system 100 in FIG. 1. The exemplary processes include a closed loop process (FIG. 2), an open-loop process (FIG. 3) and an open loop process applied to the exhaust from a rocket nozzle (FIG. 4).

The processor 106 may include a: i) feedforward neural network; ii) recurrent neural network; iii) CNN; iv) radial basis function network; v) combination of i)-iv) or other networks providing similar pattern recognition capability; or vi) empirical networks incorporating select non-empirical or first principal models.

The processor 106 may include version 3 of the YOLO (You Only Look Once by Redmon and company) object detection algorithm, allowing the processor 106 to identify all objects in an image in one pass. However, other object detection algorithms can be used (e.g. RetinaNet by Facebook AI Research, the R-CNN algorithm, the Single Shot MultiBox Defender algorithm, and others) and other algorithms can evolve from the research and development at large, to perform faster and produce higher quality results for certain objectives and applications. Such algorithms may also utilize image segmentation, multi-lateral bounding-boxes, or other strategies including algorithms external to, or embedded in, a CNN structure. Further, other learning structures may supplant a CNN concerning efficiency and performance, and may include greater capability to learn and apply context and provide greater capability for implicit or explicit reasoning and therefore, reduce some of the post processing requirements. Such networks might be implemented in software and/or hardware and include multi-dimensional codes, massively and strategically parallel computers, optical computers and quantum computers. Further, more simple learning and modeling structures could be used, benefitting from future advances in computational speeds to compensate for less sophistication in the learning and object detection algorithms. In such scenarios, the need for a CNN decreases, since at a sufficiently high computation rate, "normal" fully connected multi-layered neural networks would become fast enough to provide practical learning and detector performance.

Images can be acquired by the camera 102 in a number of ways, depending on what type of imaging is convenient for the implementation considering factors such as, but not limited to, working fluid, materials, and environmental factors. Image capture can be accomplished by electromagnetic radiation in the: i) visible spectrum; ii) infrared spectrum; or iii) any electromagnetic radiation spectrum from which a suitable camera 102 can acquire images characterizing the multi-phase fluid flow phenomena. Images may also be indirectly acquired via means other than by directly utilizing the electromagnetic radiation spectrum. Such other methods may include ultrasonic imaging. Images may also be collected and utilized differently during network training than when utilized for real-time processing. Examples include the use of high-quality video images paired with low-resolution images of the same subject flow, to train the CNN to infer or reconstruct the high-quality images from the low-quality images. The low-quality image collection may be more environmentally robust for use in the production process for monitoring and control in real-time. Images may also be acquired using gimballed cameras or cameras associated with gimballed mirrors. Images may also include source materials that are the reconstruction of non-visual or partially visible information, including derivations from, but not limited to, sound, vibrations, and odor.

If the images utilize a visible spectrum, methods for acquiring the required images may include: i) augmenting the flow loop to include a transparent view port 208 in FIG. 2, to allow imaging by an external camera 102; ii) using optical devices embedded in the flow channels; or iii) using small cameras embedded in the flow channels. Images may also be acquired from stored previously recorded media, including video, photos, drawings, graphs, and animations. Such acquired images can augment images collected from the external camera 102 or be utilized instead of images collected from an external camera 102.

The pre-processor 104 and post-processor 108 may be implemented in software and/or hardware, where such implementations may include fixed or adaptive code or neural network algorithms. The pre-processor 104 and post-processor 108 provide the necessary communications protocol, data manipulation and regulation, data correcting methods, physics-based models, probabilistic models, and other processes and models required to create the input to the processor 106 and apply and distribute the computational reasoning based on the output of the processor 106, respectively.

Computational reasoning provided by the pre-processor 104 and the post-processor 108 includes, but is not limited to, physics-based modeling, probabilistic modeling, fault and anomaly detection algorithms, best-estimate predictions, state estimations, adaptive estimations, and mathematics and logic-based conclusions and outcomes.

Inputs to the pre-processor 104 and post-processor 108 include image source data of the multi-phase flow field and processor 106 output, respectively. The pre-processor 104 and post-processor 108 may also receive auxiliary inputs including, but not limited to, constants and direct measurements and control inputs related to the monitored or controlled processes and relevant environments, including but not limited to, physical, mechanical, electro-mechanical, gravitational, and human behaviors, states, and conditions.

A communication link connects the camera 102, the pre-processor 104, the processor 106, the post-processor 108, and the controller 202. The communication link may include direct connecting cables or wireless communications, where wireless communications can include, but are not limited to, electromagnetic radiation and optical means. The controller 202, may be centralized or distributed, providing signals and instructions to actuators and other active components of the flow loop implementation.

A multi-phase flow path 210 may be any flow path, including, but not limited to: i) channel flow; ii) planar flow; iii) spheroidal flow; iv) a porous media flow, or v) free trajectory flow (i.e. flowing in some region that is not defined by walls or other mechanical boundary). Further, the multi-phase flow path 210 may be a closed-loop as illustrated in FIG. 2 or a once-through open loop, where the flow is not continually recycled, but travels over a finite path through a critical volume as illustrated in FIGS. 3-4. In FIG. 4, a flow exhaust to the environment can constitute the critical volume where the unbounded exhaust flow is imaged by the camera 102 or other imaging device. In FIG. 3 a display monitor receives output from the post-processor. Flow-loops may also be any combination of closed- and open-loop paths.

An example of an open loop flow path includes, but is not limited to, the rocket nozzle exhaust 402 in FIG. 4, which is an unbounded free-trajectory flow. In the case of rocket nozzle exhaust 402, the composition of the exhaust can provide diagnostic information pertaining to incipient failure conditions concerning the rocket propulsion system. For high-temperature applications, the camera 102 may be protected by a transparent heat shield 404.

The active systems 204 may include pumps, valves, separator, rotators, sliders, and propulsion devices. The working fluid may be composed of fluids, fluids and solids, or only solids. The heat exchanger 206 illustrated in FIGS. 2-3 is an example of a critical volume, i.e. the volume in the flow loop that is directly photographed by the high-speed camera 102. Such critical volume may be a vital component of the monitored processes, or a special channel for imaging, or an exhaust stream, or other critical volume. Augmentations of the flow loop as required to support imaging of the flow by the sensor system 100 may include a view port 208 that is sufficiently transparent to the radiation spectrum and methods utilized for image capture.

Because the intelligent sensor system 100 relies on direct inspection of multi-phase phenomena and behaviors by machine vision, it can be constructed to be robust in view of electromagnetic and radiation interference. Further, machine-vision enables accurate and reliable inspection of multi-phase fluid flow, including those that are ephemeral, which may be used to provide instructions to monitoring and controlling systems. The arbitrarily high number of types of multi-phase fluid flow phenomena that can be identified and inferred by the intelligent sensor system 100 renders it particularly useful in a broad number of industrial applications. Accordingly, the intelligent sensor system 100 provides for enhanced practical implementations of multi-phase fluid flow systems across many applications in many industries (e.g. oil and gas, space, manufacturing).

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A system for monitoring a multi-phase fluid flow, comprising:
    a preprocessor for receiving, filtering, and formatting digital images of the multi-phase fluid flow;
    a processor that includes a neural network learning algorithm linked to the preprocessor for receiving the preprocessed digital images, identifying phenomena related to the multi-phase fluid flow in the preprocessed digital images and quantifying the relative positions and geometries of the phenomena based on the digital images; and
    a post processor linked to the processor for receiving the identified phenomena, receiving the quantified relative positions and geometries of the phenomena, deriving dynamic attributes of the identified phenomena and inferring other attributes related to the multi-phase fluid flow.

2. The system of claim 1, further comprising a camera linked to the preprocessor for capturing the digital images of the multi-phase fluid flow in real-time and transmitting the digital images to the preprocessor.

3. The system of claim 1, further comprising at least one of a pump, a valve, a separator, a rotator, a slider, and a propulsion device linked to the controller for controlling the multi-phase fluid flow.

4. The system of claim 3, further comprising a heat exchanger linked to one of the pump, the valve, the separator, the rotator, the slider, and the propulsion device for receiving the multi-phase fluid flow.

5. The system of claim 2, wherein the camera is adapted to capture digital images by electromagnetic radiation in at least one of a visible spectrum, an infrared spectrum, and an electromagnetic radiation spectrum.

6. The system of claim 2, wherein the camera is adapted to capture digital images by ultrasonic imaging.

7. The system of claim 1, wherein the multi-phase fluid flow comprises one of a channel flow, a planar flow, a spheroidal flow, a porous-media flow, and a free trajectory flow.

8. The system of claim 1, further comprising a controller for controlling the multi-phase fluid flow based on at least one of the identified phenomena, the quantified relative positions and geometries of the phenomena, the derived dynamic attributes of the phenomena, and the inferred other attributes.

9. The system of claim 1, further comprising a controller for controlling a system that is dependent on the multi-phase fluid flow based on at least one of the identified phenomena, the quantified relative positions and geometries of the phenomena, the derived dynamic attributes of the phenomena, and the inferred other attributes.

10. A method for monitoring a multi-phase fluid flow, comprising:
capturing at least one attribute of the multi-phase fluid flow;
identifying phenomena related to the multi-phase fluid flow based on the at least one attribute of the multi-phase fluid flow;
quantifying the relative positions and geometries of the phenomena; and
deriving dynamic attributes related to the phenomena by correlating relative positions and geometries of the phenomena based on a sequence of the at least one attribute captured over a predetermined time-period;
inferring other attributes related to the multi-phase fluid flow based on the identified phenomena, the quantified relative positions and geometries of the phenomena and the derived dynamic attributes related to the phenomena.

11. The method of claim 10, further comprising controlling the multi-phase fluid flow based on at least one of the identified phenomena, the quantified relative positions and geometries of the phenomena and the derived dynamic attributes related to the phenomena.

12. The method of claim 10, further comprising controlling a system dependent on the multi-phase fluid flow based on at least one of the identified phenomena, the quantified relative positions and geometries of the phenomena and the derived dynamic attributes related to the phenomena.

13. The method of claim 11, wherein the multi-phase fluid flow is controlled by a controller linked to at least one of a pump, a valve, a separator, a rotator, a slider, and a propulsion device.

14. The method of claim 10, wherein the multi-phase fluid flow comprises one of a channel flow, a planar flow, a spheroidal flow, a porous-media flow, and a free trajectory flow.

15. The method of claim 10, wherein the phenomena includes at least one of a void, a wave, a shadow, a dimple, a wrinkle, foam, a bubble, a particulate, a velocity, an acceleration, a material deposition rate, an erosion rate, a phasic critical behavior point related to heat transfer, a fluid dynamic property, a thermodynamic property, a thermophysical property, an optical property, a physical property, and a volumetric and mass flow rate.

16. The method of claim 10, wherein the at least one attribute includes at least one of a digital image, sound and odor.

17. The method of claim 10, wherein the quantified relative positions and geometries of the phenomena are determined by superimposing polygons around the phenomena identified with vertices assigned from a coordinate system.

18. The method of claim 10, wherein the quantified relative positions and geometries of the phenomena are determined by utilizing image segmentation methods.

19. The method of claim 10, wherein the phenomena are identified and correlated with the quantified relative positions and geometries of the phenomena by a processor that includes a neural network learning algorithm.

20. The method of claim 19, wherein the processor comprises a convolutional neural network with an object detection algorithm.

21. The method of claim 10, wherein the at least one attribute may be captured by at least one of a video camera, a still photography camera, and a prerecorded media.

* * * * *